United States Patent [19]

Steffens et al.

[11] Patent Number: 5,173,175
[45] Date of Patent: Dec. 22, 1992

[54] FCC FEED INJECTOR

[75] Inventors: Todd R. Steffens, Mine Hill, N.J.; Stephen D. Challis, Fetcham, England

[73] Assignee: Exxon Research and Engineering Company, Florham Park, N.J.

[21] Appl. No.: 515,814

[22] Filed: Apr. 27, 1990

[51] Int. Cl.[5] .......................... B01J 8/20; F27B 15/08
[52] U.S. Cl. ..................... 208/157; 208/153; 239/594; 239/597; 422/140
[58] Field of Search .............. 422/141, 140; 239/597, 239/594; 208/153, 157; 15/415.1; D32/32, 33; D28/18

[56] References Cited

U.S. PATENT DOCUMENTS

| | | | |
|---|---|---|---|
| D. 215,875 | 11/1969 | Hoadley | D49/18 |
| D. 237,117 | 10/1975 | Orsoff | D28/18 |
| 1,007,325 | 10/1911 | Böhme | 239/597 |
| 1,015,232 | 1/1912 | Keller et al. | 239/597 X |
| 1,588,503 | 6/1926 | Spigelmire | 239/597 X |
| 2,959,537 | 11/1960 | Welty, Jr. | 422/144 X |
| 3,015,336 | 1/1962 | Caples | 15/415.1 X |
| 3,152,065 | 10/1964 | Sharp et al. | 422/140 X |
| 3,288,377 | 11/1966 | van de Roer | 239/597 X |
| 4,427,537 | 1/1984 | Dean et al. | 422/140 X |

Primary Examiner—Robert J. Warden
Assistant Examiner—Amalia Santiago
Attorney, Agent, or Firm—Chris P. Konkol; Joseph J. Allocca

[57] ABSTRACT

This invention is directed to a feed injector for a fluid catalytic cracking reaction zone, which feed injector provides improved oil atomization and dispersion. The injector comprises a straight-pass conduit section, in which a feed oil and steam are premixed, and a terminal section, where the oil is atomized and dispersed by a generally fan-shaped distributor. The feed injector produces a substantially flat spray pattern across the direction of catalyst flow in the catalyst/oil contacting section of the catalytic cracking reaction zone. Improved product yield and lower coke and light gas yields are obtained.

18 Claims, 5 Drawing Sheets

FIG. 1
PLAN-VIEW

FIG. 2
PLAN-VIEW

FIG. 3
FRONT-VIEW

FCC FEED INJECTOR

FIELD OF THE INVENTION

The present invention relates to the fluid catalytic cracking of hydrocarbons. More particularly, the invention relates to an improved feed injector for atomizing and dispersing a hydrocarbon feed into a stream of heated catalyst particles in the riser reactor of a catalytic cracking unit.

BACKGROUND OF THE INVENTION

Fluidized catalytic cracking of heavy petroleum fractions is one of the major refining methods to convert crude or partially refined petroleum oil to useful products such as gasoline and heating oils. In fluidized catalytic cracking, high molecular weight hydrocarbon liquids are contacted with hot, finely divided solid catalyst particles in a catalytic reactor. The reactor is typically in the form of a riser pipe, and the contact time of the hydrocarbon feed is on the order of a few seconds. This short contact time is necessary to optimize generation of gasoline and middle distillate fractions and to minimize economically undesirable end products, such as methane and carbon. Reaction of the feed material generates a large volume of gaseous hydrocarbons. These hydrocarbons in admixture with the catalyst flow out of the riser pipe into a separator or disengaging section of the fluid catalytic cracking unit (FCCU). The spent catalyst is separated and passed downwardly through a stripper section for return to a regenerator. Fluidizing steam is typically introduced to flow up through the down-flowing catalyst to assist in stripping hydrocarbon vapor from the spent catalyst. The desired product, in the form of hydrocarbon gas or vapor, is recovered overhead, typically through one or more cyclone separators, and is piped to a distillation column.

One problem with the injection of a hydrocarbon feed into the catalytic reactor is that if the feed is not sufficiently atomized and does not directly contact catalyst upon injection into the reactor, then thermal cracking may occur instead of catalytic cracking. This results in the generation of the undesirable end products of methane and coke, rather than the desired middle distillate hydrocarbons. Prolonged contact of the hydrocarbon feed with catalyst after discharge into the stripper section of the FCCU may also result in overcracking or further thermal cracking.

There is considerable evidence that the atomization and subsequent vaporization of the liquid feed has important effects in fluid catalytic cracking operations. Generally the most desirable reactions occur in the vapor phase and require extremely rapid movement of reactants to and from active catalytic sites. In addition, the time required for vaporization of feed droplets reduces the time available for the desired catalytic reactions. Furthermore, liquid wetting of the catalyst tends to reduce the surface area which is available to catalyze hydrocarbon reactions, and results in increased "coke" due to adsorption of heavy fractions present in the feed or formed by polymerization. Excess coke is undesirable because the process duties of the stripper and regenerator are increased as a result. In addition, coke can deposit on the surfaces of the equipment involved.

BRIEF SUMMARY OF THE INVENTION

This invention is directed to a feed injector for introducing a feed oil into the reaction zone of a fluid catalytic cracking unit (FCCU), which injector provides improved feed oil atomization and dispersion. The injector comprises, in the upstream direction, a straight-pass tube section and a terminal generally fan-shaped section where the oil is finely atomized and distributed. The oil is sprayed in a substantially flat pattern across the direction of the regenerated catalyst flow in the catalyst/feed oil contacting section of the catalytic reactor portion of the FCCU. The resulting catalyst/feed oil contacting provides improved product yield and lower coke and light gas yields. Additionally, the present feed injector has the advantage of simplicity and economy of construction and use. Since the preferred embodiment has no internal pieces, the present feed injectors are advantageous for use with heavier feeds that might coke and form obstructions in the flowpath of the feed oil.

BRIEF DESCRIPTION OF THE DRAWINGS

The invention will be more clearly understood upon reference to the detailed discussion below in conjunction with the drawings wherein.

DESCRIPTION OF PREFERRED EMBODIMENTS OF THE INVENTION

As mentioned above, the present invention is particularly concerned with atomizing and dispersing a liquid hydrocarbon feed in a riser reactor of a catalytic cracking unit. It is desirable that contact and reaction of the hydrocarbon feed with the catalyst particles proceeds as the mixture thereof flows through the reactor riser in the allotted time of not more than about 10 seconds, preferably 3 seconds or less. For such short reaction times, it is essential that the liquid feed be rapidly converted to gas to effect the necessary catalyst-gas phase reactions. Such reactions crack the heavier hydrocarbons. To achieve rapid gasification, the atomization of the feed oil into the fluidized catalyst stream must be optimal as to droplet size, distribution and spray angles at reasonable, commercially-available, flow rates and pressures. Further, feed injectors for creating such patterned flow must be capable of extended service without plugging (as by formation of coke from the hot hydrocarbons flowing through it) or mechanical wear (as by abrasion of the fluidized catalyst particles).

Improved feed dispersion and atomization is attained by the present feed injector to give extremely rapid and uniform contact between the feed and the circulating catalyst particles. The present feed injector can produce a fine dispersion with a droplet average diameter suitably in the range of 20 to 2000 microns, preferably less than 500 microns and more preferably less than 100 microns. A 60 microns droplet size, which approximates the average catalyst particle size, is exemplary.

The actual feed oil drop size and distribution obtained by the present feed injector depends on a great many variables. These include the physical properties of the liquid sprayed (viscosity, density, and surface tension), physical properties of the stream into which the liquid is sprayed, process operating conditions (for example, liquid and gas velocities), and feed injector design, for example, the geometry and size. In particular, the feed liquid surface tension and viscosity may vary greatly over the range of temperatures employed in catalytic cracking. For example, typically the surface tension decreases from 20-25 dynes/cm at 400° F. to 5-10 dynes/cm at 800° F.

Important other variables to consider in feed atomization are the liquid pressure drop across the nozzle (or the kinetic energy of the exiting liquid stream), the relative velocity between liquid and any atomization enhancing gas, for example steam, at the point of liquid ejection, and the ratio of gas/liquid employed.

In general, the average feed droplet size decreases as pressure drop increases. The quantitative relationship may vary from one particular injector to another, and often differs between different pressure drop regimes in a given injector. However, the effect of pressure drop across the injector is specific to the system examined and pressure drop interacts with other variables.

The pressure drop available for feed injector design is based on the feed pump generated head less pressure drop over preheat exchangers and furnace, feed piping and feed flow control valve. Typically, the available pressure drop for nozzle design is between 30 and 50 psi in existing feed systems, and this is generally adequate for using the present feed injector. A higher pressure drop, if available, minimizes spray droplet size. Operation below 15 psi, however, may lead to problems of poor spray atomization and distribution, and upstream piping vibration.

An oil-only feed may be "pressure atomized" and/or sprayed into the FCCU reactor. However, in the preferred operating mode, a lower molecular weight medium, referred to as an atomization enhancing medium, is injected into the oil feed to reduce the oil partial pressure and to increase the total fluid flow and velocity through the injector. Suitable media include hydrogen, steam, nitrogen, FCC off-gas, and $C_6-$ hydrocarbons. Most preferably, a steam/oil mixture is used as the feed stream to the FCCU reactor. The ratio of steam/oil can be adjusted during operations based on changes in oil feed type and properties. The amount of steam in the mixture influences the density of the mixture and will therefore have an impact on atomization. General commercial practice, suitable with the present process, is to use about 1.0 wt. % steam for light feed types and about 3.0 to 5.0 wt. % steam for heavy, more viscous feed types. Typically, the steam is mixed with the oil feed in a T-junction. The amount of steam is controlled by an upstream orifice or valve in a steam line across which the pressure drop from a higher pressure to injector pressure is taken.

For injection into the catalytic cracking reaction zone, the feed is normally preheated to a temperature typically ranging from ambient to about 800° F. The preheat temperature suitably reduces feed surface tension and may provide some vapor which, together with injection of an atomization enhancing medium such as steam, gives a suitable velocity for feed atomization.

The present feed injectors may achieve a suitable exit velocity while minimizing injector pressure drop. Various pressure drop correlations known to those of ordinary skill in the art may be used to design the specific dimensions of the feed injectors for a particular use. Suitably, the feed injectors of the present invention are operated at an exit velocity of about 100 to 350 ft/sec, preferably about 150 to 200 ft/sec. A suitable pressure drop across the nozzle is about 15 to 75 psi, preferably about 25 to 35 psi, but will depend on the equipment and capabilities.

The liquid feed oil, which may be partially vaporized, is injected through the throat section portion of the feed injector, which throat section has a relatively small orifice or cross-sectional flow area. Orifice heights are often on the order of 0.3 to 2 in, suitably in the range of 0.5 to 1 in. A suitable orifice width is in the range of about 1.5 to 5 in, typically about 2.5 to 3.5 in. The liquid feed oil is forced by the pressure through the orifice to form an unstable liquid jet or sheet which breaks up into droplets on leaving the the feed injector.

Figure 1:
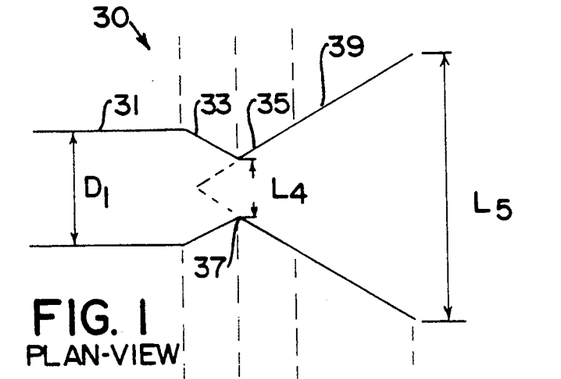
FIG. 1 is a schematic diagram in plan-view of a first embodiment of a feed injector, according to the present invention, for a fluid catalytic cracking unit.
Figure 2:
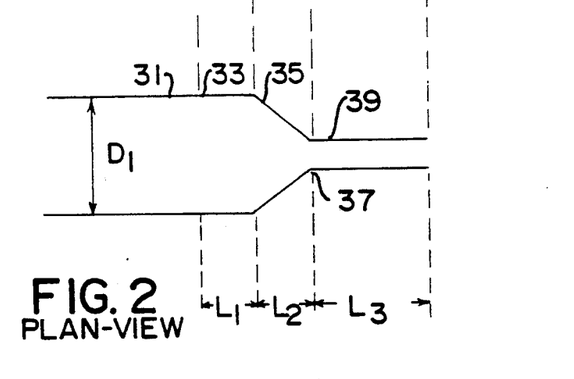
FIG. 2 is a schematic diagram in side-view of the feed injector of FIG. 1.
Figure 3:
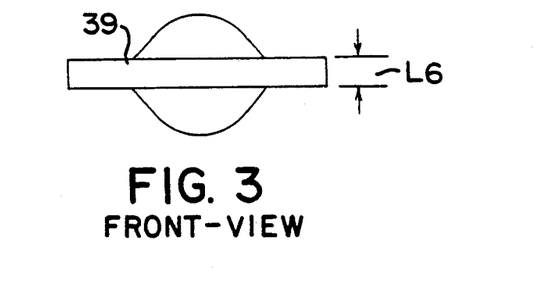
FIG. 3 is a schematic diagram in front-view of the feed injector of FIGS. 1 and 2.

FIGS. 1 to 3 show the geometric configuration of a first embodiment of a feed injector according to the present invention. It is noted that the specific geometric ratios will vary depending on individual application considerations and/or limitations, for example the steam/oil ratio, the number of injectors, etc. The oil and the feed are mixed axially in a pipe and fed into the injector tip. The injector has an elongated rectangular or oval shaped orifice which provides atomization of the feed, as explained in detail below.

As shown in FIGS. 1 and 2, the feed injector, generally designated 30, comprises a pipe or conduit section 31 of average diameter $D_1$ for providing a mixture of a feed liquid and an atomizing enhancing medium or gas, for example steam, to a nozzle portion which comprises, in the upstream direction, an optional, in plan-view, converging section 33 of length $L_1$, which converges to a plan-view width of $L_4$. The latter section is followed by a simultaneously converging (side-view) and diverging (plan-view) section 35 of side-view length $L_2$. Importantly, the cross-sectional area of the nozzle is thereby continually decreased to a throat section 37. The throat section comprises a rectangular or oval shaped orifice, in cross-section, which provides atomization of the feed. The throat section leads to a substantially, in side-view flat, and in plan-view diverging fan-shaped distributor end section 39 of length $L_3$ and maximum plan-view width $L_5$. As shown in the front-view of FIG. 3, the exit of the distributor end section 39 has a thickness of $L_6$. The distributor end section 39 is shown in FIG. 1 to diverge at an angle of $\theta$ in plan-view.

The fan-shaped distributor end section 39 provides a substantially flat fan-shaped spray pattern across the flow of regenerated catalyst in the riser reactor, resulting in good catalyst/oil contacting. The fan-shaped distributor end section achieves moderate injection velocities, thus minimizing catalyst attrition and cross flow disturbance of the catalyst stream. A notable feature of this design is the flattened orifice of throat section 37 which helps initiate a fan-shaped flow pattern to improve distribution of the feed oil. Another notable feature of this design is the plan-view diverging section 35 which begins downstream of the throat section in order to ensure filling of the fan-shaped distributor section 39 by the feed stream. Such filling avoids ingress of catalyst into the distributor end section and is critical to its mechanical life and performance, avoiding potential erosion concerns. Thus, the present feed injector provides both improved process performance (lower coke and gas yields) as well as improved mechanical reliability.

Figure 4:
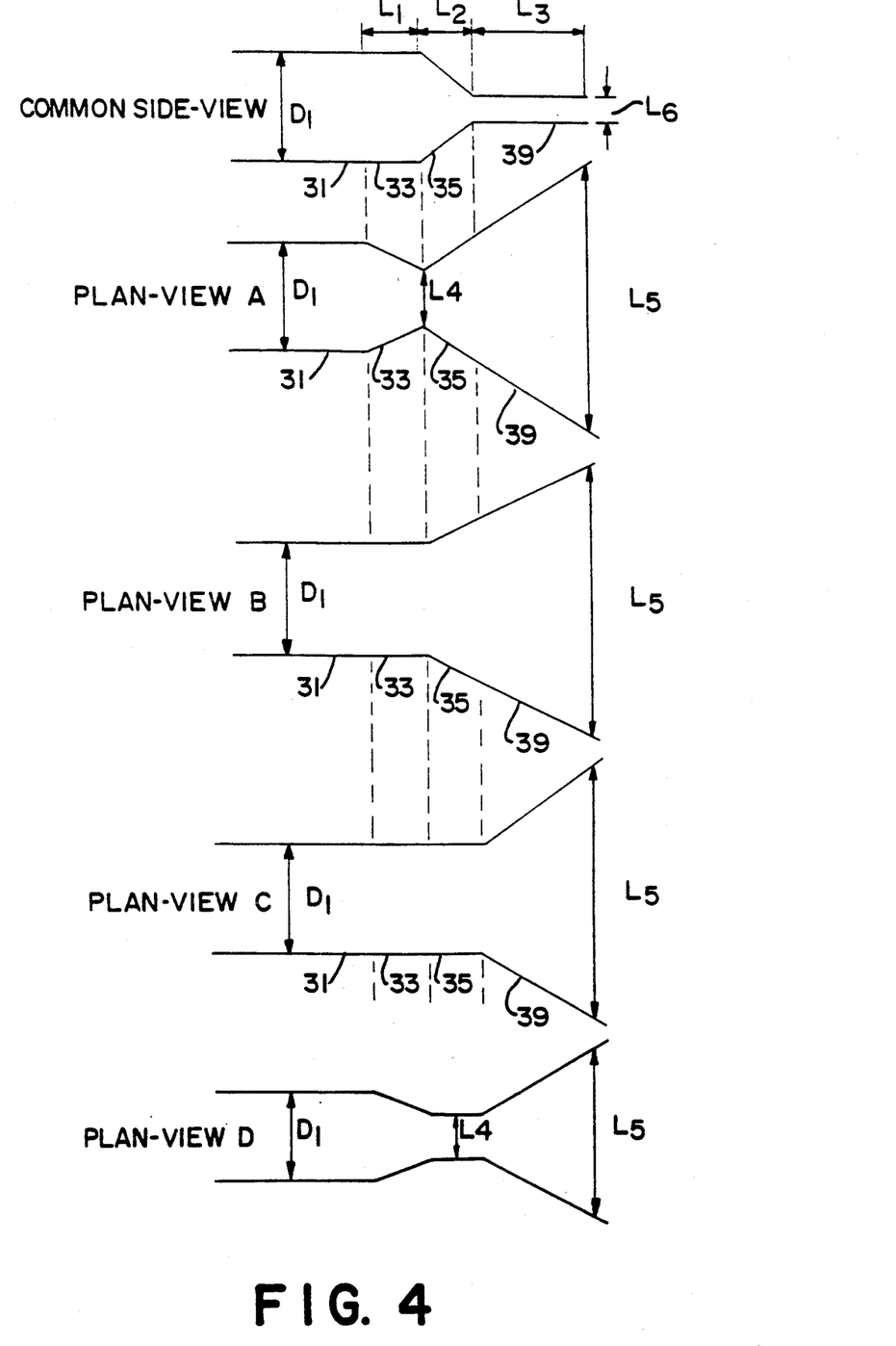
FIG. 4 is a schematic diagram in plan-view of a first, second, and third embodiment of a feed injector, according to the present invention, for application to a catalytic cracking unit.

With reference to FIGS. 1 to 3, the dimensions of the feed injector suitably range as follows:

$0 \leq L_1 < D_1$ $0.25 D_1 < L_2 < D_1$ $0.5 D_1 < L_3 < 2 D_1$ $0.5 D_1 < L_4 \leq D_1$ $D_1 < L_5 \leq 10''$ $0.5'' \leq L_6 \leq 0.5 D_1$ $30° \leq \theta \leq 90°$ FIG. 4 shows a comparison of first, second, third and fourth embodiments of the present invention which differs with respect to the plan-view. Embodiment A shows the same type of injector as in FIGS. 1 to 3. Embodiments B and C differ from embodiment A in that section 33 does not converge. The embodiment C additionally differs with respect to the plan-view in that section 35 does not diverge. Embodiment D differs from embodiment A in that while section 33 diverges, section 35 is straight in plan view.

Figure 5:
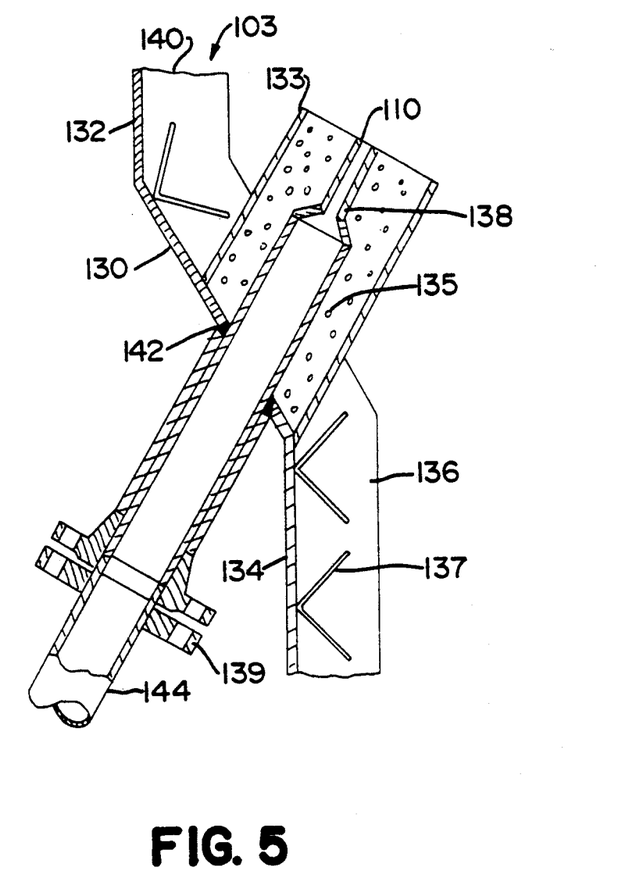
FIG. 5. is a cross-sectional side-view of one embodiment of a feed injector, according to the present invention, for providing atomization of a hydrocarbon feed into a riser reactor, which feed injector is shown attached to the wall of the riser reactor.

Referring now to FIG. 5, a feed injector according to the present invention is shown connected to wall 103 of an FCCU reactor riser. As evident, the feed injector assembly is an integral part of the FCCU reactor system. In a typical unit, the feed injector may discharge at an angle to the riser of between 0° and 75°, which riser is typically vertical at the injection point. The distributor end section 110 of the feed injector is shown positioned at an angle of 30 degrees to the vertical. The feed injector is shown in cross-section transversing a conical segment shaped wall section 130 which is itself at a 30 degree angle from the vertical, between an upper relatively larger diameter cylindrical vertical wall portion 132 and a lower relatively smaller diameter cylindrical vertical wall portion 134 of the riser.

Different attachment angles and orientation angles may be optimal depending on the specific unit and type of injector. As evident, the installation of the injector may be conventional and utilize a pipe cap or guard 133 to protect the projection of the feed injector within the riser. Castable refractory linings 135 and 136, supported by metal plates 137, occur beneath the outer metal walls 140 of the reactor apparatus. Suitably kaowool paper 138 surrounds the circumference of the feed injector where it pierces the riser wall. Weldings at appropriate edges, for example 142, render connections airtight. A flange 139 connects the injector to upstream piping 144. Other mechanical arrangements, for attaching the feed injector to the wall of the reactor, will be known to those skilled in the art.

In the particular injector assembly configuration shown in FIG. 5, a mixture of steam and oil is introduced upstream through a steam/oil fluid inlet. Additionally, an isolation valve between flanges of the piping system leading to the feed injector assembly may be used to allow for onstream maintenance of the assembly. This isolation valve is usually a gate valve, although other valve types such as a ball valve may be used. The isolation valve may be closed and the assembly then may receive on-stream maintenance, for example, if feed type and chemistry should eventually cause undesirable coking or partial plugging of the inside of the injector.

To attain optimal liquid-gas/solids distribution, multiple feed injectors are preferred. An oil feed line may supply a ring or plurality of feed injectors via an annular manifold. Typically, a single ring of injectors is used, although multiple levels of injectors may be considered if additional capacity or feed segregation is desired.

In a multiple feed injector design, the feed injectors are preferably installed in a symmetric radial pattern on the reactor riser, to provide uniform coverage of the entire riser cross-section. Also, the injectors are preferably located a minimum distance above the point where the riser expansion commences, to avoid contacting the injected oil droplets with de-accelerated catalyst.

The feed injector projection into the catalyst stream should be minimized to reduce the potential for external nozzle errosion. This also minimizes disturbance to catalyst flow and the occurrence of "dead zones" where the catalyst is not directly contacted by the oil spray.

Process control instrumentation is recommended to maintain an efficient injector performance under varying process conditions and to permit effective monitoring of performance. The total steam rate to the injectors may be flow controlled, with flow set point reset by oil manifold pressure. Such a control system maintains a reasonably constant injector pressure drop and compensates for changes in feed flow rate, feed vaporization, or the like.

EXAMPLE 1

This example illustrates tests for evaluating the feed atomization and spray pattern associated with a feed injector according to the present invention. The experimental system involved injecting water into a so-called patternator, which ascertained the spray pattern distribution for each feed injector tested. The patternator consisted of a long rack of covered glass tubes, operated by remote control, that was placed in the middle of the nozzle spray pattern. A cover was removed simultaneously from the entire rack and quickly replaced so that balls, floating at the top of the water collected in the tubes, would present a "picture" of a spray pattern. The patternations were then fed into a printer.

The test facilities included a 750 SCFM capacity air compressor and two 1000 GPM water pumps. The air flow was metered through a manifold of four rotometers connected in parallel. The water flow was measured by either a paddle wheel meter or a system of four graduated rotometers. Pressure drop was measured by a number of analog guages and one digital instrument located on the water line about one foot from the injector entrance. Injectors were oriented in the vertical downward position. The nozzles terminated anywhere between 6 to 8 feet above the floor, depending on the length of upstream piping used in the particular test.

Injector pressure drop was measured over a wide range of air rates (50 to 750 SCFM) at water rates of 150 and 250 GPM. The water rates correspond to 5140 B/D and 8570 B/D respectively. Air rates were set to be representative of typical concentrations of injection steam in feed on commercial cat plants. Equivalent steam/oil ratios for the testing ranged from 0.2 to 1.5 wt. %. Tests were also run in which air was maximized to a compressor constraint. Equivalent steam/oil ratios for these tests were as high as 3 wt. %.

Figure 6:
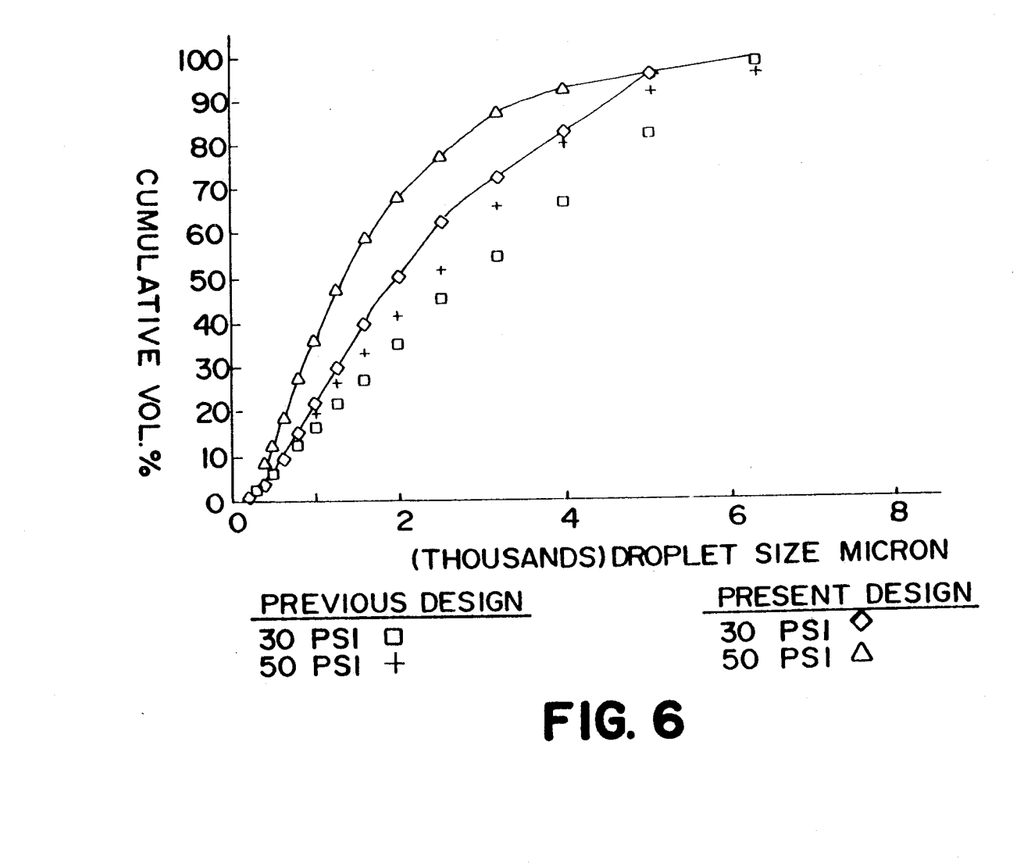
FIG. 6 is a graph showing the droplet size distribution produced by a feed injector according to the present invention compared to the droplet size distribution of a previously used feed injector, which droplet size distributions were experimentally obtained according to Example 1 below.
Figure 7A:
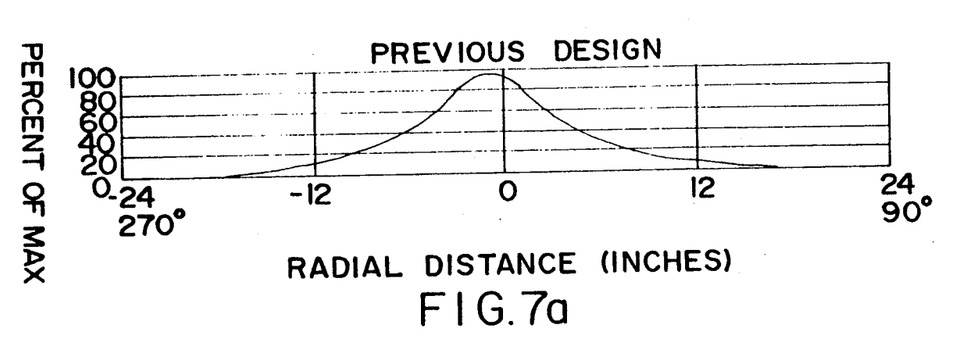
FIG. 7a and 7b shows two graphs comparing the spray distributions, respectively, of a feed injector according to the present invention and a previously used feed injector, which spray distributions were experimentally determined according to Example 1 below.
Figure 7B:
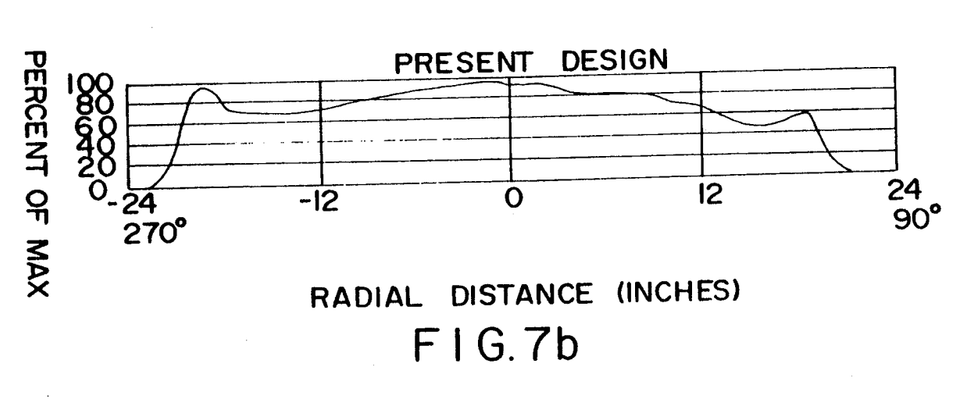

Testing of an injector according to the present invention showed that it gave an evenly distributed spray. Spray droplet size did appear coarse; however, the testing of this injector was conducted at very low pressure drops. When the pressure drop reached 15 psi, the coarseness of the spray lessened. There appeared to be some spray pulsation at lower air rates. The spray angle was approximately 40°. FIGS. 6 and 7a and 7b show the droplet size and spray angle distribution, respectively, associated with the present injector at a typical pressure drop and feed rate. It is evident from FIG. 6 that the droplet size distribution obtained with the present injector was wider and more bimodal, at the same pressure drop, compared to a previous injector design. As shown in FIG. 7a and FIG. 7b, the spray angles of the present injector were also wider, and a more uniform spray pattern was obtained compared to the denser central core pattern of the previous injector.

EXAMPLE 2

This example illustrates the predicted calculated performance of a typical feed injector according to the present invention. Eight feed injectors were sized to handle 50 psi maximum pressure drop ($\Delta P$) for various combinations of total feed rate (25–41.5 kB/SD), steam rate (up to 11.0 klb/h), and oil feed temperature (330°–600° F.). The design conditions are given in Table I below. The base steam rate was based on 2 wt. % FF steam injection for the coldest oil temperature (330° F.) and a maximum total oil rate of 41.5 kB/SD. A listing of steam requirements to achieve up to 50 psi pressure drop ($\Delta P$) as a function of oil feed rate and temperature is given in Table 2 below. In addition, the calculated injector tip velocities are presented. As shown, several oil feed/temperature combinations exhibit less than 50 psi $\Delta P$ across the nozzle (as low as 37 psi). These $\Delta P$s are limited by either steam rate injection (11.0 klb/h max), or nozzle tip velocity (150 fps max) to maintain catalyst attrition at acceptable levels while avoiding over penetration of oil droplets. While maximum $\Delta P$ is desirable, the lower $\Delta P$s estimated ($\geq 37$ psi) are within design guidelines for providing a good atomized oil spray pattern with a uniform droplet size distribution.

The feed injectors are operated to provide a uniform coverage of catalyst with feed, and to minimize the risk of nozzle plugging if the injectors are not in use. However, if isolation of a feed injector is necessary due to its poor performance, the feed injectors can handle the design operating conditions with only 7 active nozzles. Table 2 also lists the steam requirements with only 7 active nozzles for the design conditions. As shown, relative to the full 8 active nozzle operation, less steam is required to achieve up to the 50 psi $\Delta P$ across the feed nozzle.

TABLE 1

| Feed Rate: kB/SD | |
|---|---|
| Maximum | 36.5 |
| Ultimate Maximum | 41.5(2) |
| Minimum | 25 |
| Feed Properties | |
| Nominal cut, °F. | 650/1100 |
| Gravity, °API | 23.7 |
| Temperature (w/o heater), °F. | 330–550 |
| (w/heater), °F. | 600 |
| GCD Distillation | |
| LV % | °F. |
| IBP | 448 |
| 5 | 572 |
| 10 | 626 |
| 30 | 734 |
| 50 | 813 |
| 70 | 898 |
| 80 | 963 |
| Available upstream pressure, psig | 90–175 |
| Steam injection rate, wt. % | 1 |
| Maximum steam injection rate, wt. % | 2 |

TABLE 2

| Nozzles In Use | 8 | | 7 | |
|---|---|---|---|---|
| Oil Temperature, °F. | 600 | 330 | 600 | 330 |
| Oil Rate, kB/SD | Steam injection, wt. % FF | | | |
| 41.5 | 1.6 | 2.0 | 1.15 | 1.45 |
| 40.0 | 1.7 | 2.1 | 1.25 | 1.6 |
| 36.5 | 1.9 | 2.3 | 1.55 | 2.0 |
| 25.0 | 2.9 | 3.3 | 2.5 | 3.3 |
| | Steam injection, klb/hr | | | |
| 41.5 | 8.8 | 11.0 | 6.4 | 8.0 |
| 40.0 | 9.1 | 11.0 | 6.7 | 8.5 |
| 36.5 | 9.2 | 11.0 | 7.5 | 9.7 |
| 25.0 | 9.6 | 11.0 | 8.3 | 11.0 |
| | Nozzle $\Delta P$, psi | | | |
| 41.5 | 50 | 50 | 50 | 50 |
| 40.0 | 50 | 48 | 50 | 50 |
| 36.5 | 47 | 45 | 50 | 50 |
| 25.0 | 39 | 37 | 41 | 42 |
| | Injector tip velocity, fps | | | |
| 41.5 | 144 | 120 | 124 | 103 |
| 40.0 | 147 | 120 | 128 | 108 |
| 36.5 | 148 | 119 | 141 | 121 |
| 25.0 | 149 | 115 | 148 | 132 |

Those skilled in the art will readily appreciate that the injectors of the present invention will have application to various types of catalytic cracking units. While the invention has been described in connection with specific embodiments, it will be understood that this invention is capable of further modification, and that this application is intended to cover any variations, uses or adaptations of the invention and including such departures from the present disclosure as come within known or customary practice in the art to which the invention pertains and as may be applied to the essential features hereinbefore set forth, and as fall within the scope of the invention.

What is claimed is:

1. A feed injector for introducing an oil feed into a stream of catalyst in a catalytic cracking reaction zone, which feed injection comprises:
   a conduit section of diameter $D_1$ for providing a mixture of a feed and an atomizing enhancing medium, said conduit section followed in sequence by
   a conduit section of length $L_1$ in side view which is straight in side view and is converging in plan view, and converges to a width in plan view of $L_4$, a throat conduit section of length $L_2$ in side view which simultaneously converges in side view and diverges in plan view, a fan-shaped distribution end section of length $L_3$ which is simultaneously substantially straight in side view and diverging in plan view having a maximum width in plan view of $L_5$ and exit thickness in side view of $L_6$, said fan-shaped distributor end section diverging at an angle $\theta$ in plan view to define a fan-shaped spray pattern, and wherein the dimensions of the feed injector range as follows:

$0.5D_1 < L_3 < 2D_1$ $D_1 < L_5 \leq 10''$ $0.5'' \leq L_6 \leq 0.5D_1$ $30° \leq \theta \leq 90°$ $0 \leq L_1 \leq D_1$ $0.5D_1 < L_4 \leq D_1$ wherein the internal cross-sectional area of the injector is continually decreased in said throat conduit section, said throat conduit creating an orifice for atomization of an oil feed and wherein said throat section has a cross-sectional shape selected from the group consisting of a rectangular or oval.

2. The feed injector of claim 1 where it is connected to a wall of a catalytic cracking reactor riser.

3. The feed injector of claim 2, wherein the injector is at an angle to the riser of between 0° and 90°.

4. The feed injector of claim 3, wherein the injector is at an angle to the riser of between 10° and 75° degrees.

5. The feed injector of claim 1 wherein the dimension $L_2$ ranges as follows:

$0.25D_1 < L_2 < D_1.$

6. A feed injector for introducing an oil feed into a stream of catalyst in a catalytic cracking reaction zone, which feed injector comprises:

a conduit section of diameter $D_1$ for providing a mixture of a feed and an atomizing enhancing medium, said conduit section followed in sequence by a conduit section of length $L_1$ in side view which is straight in side view and is converging in plan view, and converges to a width in plan view of $L_4$, a throat conduit section of length $L_2$ in side view which simultaneously converges inside view and is straight in plan view, a fan-shaped distribution end section of length $L_3$ which is simultaneously substantially straight in side view and diverging in plan view having a maximum width in plan view of $L_5$ and exit thickness in side view of $L_6$, said fan-shaped distributor end section diverging at an angle $\theta$ in plan view to define a fan-shaped spray pattern, and wherein the dimensions of the feed injector range as follows:

$0 \leq L_1 < D_1$ $0.5D_1 < L_4 \leq D_1$ $0.5D_1 < L_3 < 2D_1$ $D_1 < L_5 \leq 10''$ $0.5'' \leq L_6 \leq 0.5D_1$ $30° \leq \theta \leq 90°$ wherein the internal cross-sectional area of the injector is continually decreased in said throat conduit section, said throat conduit creating an orifice for atomization of an oil feed and wherein said throat section has a cross-sectional shape selected from the group consisting of a rectangular or oval.

7. The feed injector of claim 6 wherein the dimension $L_2$ ranges as follows:

$0.25D_1 < L_2 < D_1.$

8. The feed injector of claim 6 wherein it is connected to a wall of a catalytic cracking reactor riser.

9. The feed injector of claim 8 wherein the injector is at an angle to the riser of between 0° and 90°.

10. The feed injector of claim 9, wherein the injector is at an angle to the riser of between 10° and 75°.

11. A process for injecting a feed oil into a reaction zone of a fluid catalytic cracking zone, comprising: providing a fluid catalytic cracking zone, atomizing and distributing said feed oil into said fluid catalytic cracking zone by means of a feed injector which comprises:

a conduit section of diameter $D_1$ for providing a mixture of a feed and an atomizing enhancing medium, said conduit section followed in sequence by a conduit section of length $L_1$ in side view which is straight in side view and is converging in plan view, and converges to a width in plan view of $L_4$, a throat conduit section of length $L_2$ in side view which simultaneously converges inside view and diverges in plan view, a fan-shaped distribution end section of length $L_3$ which is simultaneously substantially straight in side view and diverging in plan view having a maximum width in plan view of $L_5$ and exit thickness in side view of $L_6$, said fan-shaped distributor end section diverging at an angle $\theta$ in plan view to define a fan-shaped spray pattern, and wherein the dimensions of the feed injector range as follows:

$0.5D_1 < L_3 < 2D_1$ $D_1 < L_5 \leq 10''$ $0.5'' \leq L_6 \leq 0.5D_1$ $30° \leq \theta \leq 90°$ $0 \leq L_1 \leq D_1$ $0.5D_1 < L_4 \leq D_1$ wherein the internal cross-sectional area of the injector is continually decreased in said throat conduit section, said throat conduit creating an orifice for atomization of an oil feed and wherein said throat section has a cross-sectional shape selected from the group consisting of a rectangular or oval.

12. A process for injecting a feed oil into a reaction zone of a fluid catalytic cracking zone, comprising: providing a fluid catalytic cracking zone, atomizing and distributing said feed oil into said fluid catalytic cracking zone by means of a feed injector which comprises:

a conduit section of diameter $D_1$ for providing a mixture of a feed and an atomizing enhancing medium, said conduit section followed in sequence by a conduit section of length $L_1$ in side view which is straight in side view and is converging in plan view, and converges to a width in plan view of $L_4$, a throat conduit section of length $L_2$ in side view which simultaneously converges in side view and is straight in plan view, a fan-shaped distribution end section of length $L_3$ which is simultaneously substantially straight in side view and diverging in plan view having a maximum width in plan view of $L_5$ and exit thickness in side view of $L_6$, said fan-shaped distributor end section diverging at an angle $\theta$ in plan view to define a fan-shaped spray pattern, and wherein the dimensions of the feed injector range as follows:

$0 \leq L_1 < D_1$ $0.5 D_1 < L_4 \leq D_1$ $0.5 D_1 < L_3 < 2 D_1$ $D_1 < L_5 \leq 10''$ $0.5'' \leq L_6 \leq 0.5 D_1$ $30° \leq \theta \leq 90°$ wherein the internal cross-sectional area of the injector is continually decreased in said throat conduit section, said throat conduit creating an orifice for atomization of an oil feed and wherein aid throat section has a cross-sectional shape selected from the group consisting of a rectangular or oval.

13. The process of claim 11 or 12, further comprising admixing an atomization enhancing medium with the oil feed prior to passing the admixture through said throat section of said feed injector.

14. The process of claim 13, wherein said atomization enhancing medium is steam.

15. The process of claim 11 or 12, wherein the average droplet diameter is less than 500 microns.

16. The process of claim 11 or 12, wherein the pressure drop across the feed injector is in the range of about 15 to 75 psi.

17. The process of claim 11 or 12, wherein the exit velocity of the the feed oil is in the range of about 100 to 350 ft/sec.

18. The process of claim 11 or 12, wherein the dimension $L_2$ ranges as follows:

$0.25 D_1 < L_2 < D_1$.

* * * * *